United States Patent
Dubal et al.

(10) Patent No.: US 7,376,761 B2
(45) Date of Patent: May 20, 2008

(54) CONFIGURATION DATA MANAGEMENT

(75) Inventors: Scott P. Dubal, Hillsboro, OR (US);
Douglas D. Boom, Portland, OR (US);
Elizabeth M. Kappler, Hillsboro, OR (US);
Mark V. Montecalvo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 539 days.

(21) Appl. No.: 11/028,130

(22) Filed: Dec. 30, 2004

(65) Prior Publication Data

US 2006/0149859 A1    Jul. 6, 2006

(51) Int. Cl.
*G06F 11/00* (2006.01)
*G06F 3/00* (2006.01)

(52) U.S. Cl. .................. 710/8; 713/1; 714/6; 714/15

(58) Field of Classification Search .............. 710/8–13; 713/1–2, 100; 714/15.6–8
See application file for complete search history.

(56) References Cited

U.S. PATENT DOCUMENTS

| | | | | |
|---|---|---|---|---|
| 5,938,764 | A * | 8/1999 | Klein | 713/1 |
| 6,282,640 | B1 * | 8/2001 | Klein | 713/1 |
| 6,438,687 | B2 * | 8/2002 | Klein | 713/1 |
| 6,851,073 | B1 * | 2/2005 | Cabrera et al. | 714/15 |
| 6,978,294 | B1 * | 12/2005 | Adams et al. | 709/217 |
| 7,000,142 | B2 * | 2/2006 | McCombs | 714/6 |

* cited by examiner

*Primary Examiner*—Christopher Shin
(74) *Attorney, Agent, or Firm*—Konrad Raynes & Victor LLP

(57) ABSTRACT

Corrupted configuration data stored in a first memory for a device may be restored using backup configuration data stored in a second memory. In one embodiment, the second memory may be carried by the device itself. In another embodiment, the second memory may be carried on a motherboard and may store backup configuration data for more than one device. Other embodiments are described and claimed.

41 Claims, 3 Drawing Sheets

CONFIGURATION DATA MANAGEMENT

BACKGROUND

A computer system may have a number of devices including video displays, speakers, printers, keyboards, pointing devices, and various ports including serial, parallel and network ports. The processor of the system typically communicates with the devices via one or more peripheral busses which transmit control, address and data bits. One such bus frequently used is the Peripheral Component Interconnect (PCI), a local bus standard. There are other bus standards.

Devices such as an input/output (I/O) devices are often connected to the computer system bus using another device typically referred to as an I/O controller or adapter, which facilitates communication between the system processor and another device. For example, a video adapter for a video display device, typically includes memory to temporarily store display information, logic to process display information and interface circuitry to transfer information between the bus and the adapter and between the adapter and the video display. Other examples of I/O controllers for devices include sound adapters, storage controllers, network controllers etc.

Some devices may include one or more integrated circuit chips which may be soldered or otherwise connected to a support which may include a main circuit board such as a motherboard. Other devices may be carried on one or more expansion boards or cards, each of which has a number of connectors which are received in a connector socket often referred to as an expansion slot. The connector sockets are typically mounted on the main circuit board or motherboard. Still other devices may be external devices connected by a cable or a wireless connection to an I/O port of the computer system.

When a computer system is first turned on or restarted, the system processor which may include one or more central processing units (CPUs), initializes itself. In this initialization, the system processor looks up its first instruction in a startup program such as a basic input/output system (BIOS) program, which is typically stored in nonvolatile memory such as a read-only-memory (ROM). The startup program, among other tasks, typically takes an inventory of the various busses and the devices coupled to the busses and checks the status of the devices to determine if the devices are working properly. Once the system processor has been initialized, an operating system is typically loaded from storage such as a hard drive in a boot sequence. The storage which contains a boot record which indicates to the system processor where to find the beginning of the operating system and the subsequent program file to initialize the operating system, is often referred to as the boot drive.

Upon initialization of the operating system, files of the operating system are copied into memory and the operating system typically takes over control of the boot process. At this point, the operating system often performs another inventory including an inventory of the devices coupled to the bus and loads the appropriate drivers to configure and otherwise control the devices. The operating system may reserve portions of the system memory for use by the inventoried devices.

To facilitate the inventory of the devices, many devices maintain in a nonvolatile memory, such as an electrically erasable programmable read-only memory (EEPROM), a configuration data structure containing device identification and other information useful for configuring the device. This information may include information sometimes referred to as vital product data (VPD). For example, a PCI device often has an EEPROM which stores a data structure often referred to as a "configuration header" which typically contains vendor identification, device identification, status, command, class code, memory, interrupt and possibly other information, depending upon the particular device.

The configuration data structure typically is placed within a configuration address space which permits the system processor to address the configuration data structure of each device to read or write configuration data. In addition to initial configuration, information within the configuration data structure may be accessed and updated during regular operation as well.

In some systems, the particular address space within the configuration address space assigned to the configuration data structure for a particular device may depend upon the location of the device. For example, the configuration data structure of a device may be placed in one location of the configuration address space if placed in one slot and may be placed in a different location of the configuration address space if placed in a different slot. In one system, the system processor can identify devices within the system by addressing appropriate locations within the configuration address space. If valid data is returned, the presence and identity of a device is detected at the associated circuit board or slot location. If the returned data is missing or invalid, the portion of the system associated with the particular configuration address space location may be deemed to be unoccupied by a properly operating device.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 1:
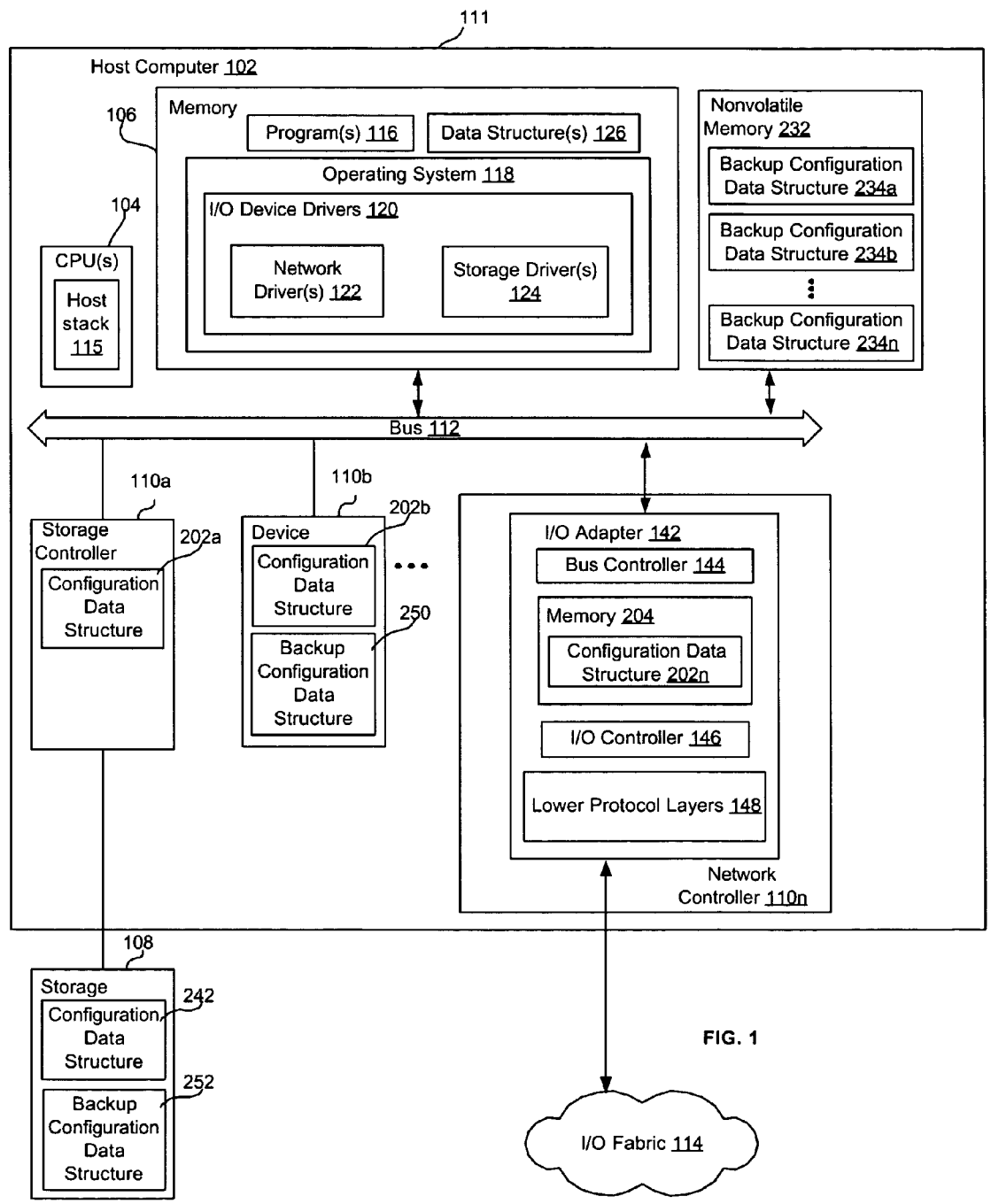
FIG. 1 illustrates an embodiment of a computing environment.

FIG. 1 illustrates a computing environment in which aspects of described embodiments may be employed. A host computer 102 includes one or more system processors or central processing units (CPUs) 104, a volatile memory 106 and an I/O device 108 which is, in this embodiment, a nonvolatile storage 108 (e.g., magnetic disk drives, optical disk drives, a tape drive, etc.). The host computer 102 is coupled to one or more devices 110a, 110b . . . 110n via one or more busses such as a bus 112, which is maintained on a board supported on a chassis 111. In the illustrated embodiment, the device 110a is a storage controller, the device 110b may be any device such as a bridge, for example, and the device 110n is depicted as a network controller. Any number of devices 110a . . . 110n including video controllers, port adapters etc. may be attached to the local bus 112 of the host computer 102.

As explained in greater detail below, configuration data stored in each device 108, 110a, 110b . . . 110n may be stored in a second location as a backup should the original copy become corrupted. If so, the corrupted copy may be replaced by the backup copy to ensure proper initialization or operation of the associated device 108, 110a, 110b . . . 110n.

The storage controller 110a controls the reading of data from and the writing of data to the storage 108 in accordance with a storage protocol layer. The storage protocol may be any of a number of suitable storage protocols including Redundant Array of Independent Disks (RAID), High Speed Serialized Advanced Technology Attachment (SATA), parallel Small Computer System Interface (SCSI), serial attached SCSI, etc. Data being written to or read from the storage 108 may be cached in a cache of the storage controller device 110a in accordance with suitable caching techniques. The storage controller may be integrated into the CPU chipset, which can include various controllers including a system controller, peripheral controller, memory controller, hub controller, I/O bus controller, etc. Alternatively, the storage controller 110a may be carried on a separate expansion card or board or in a separate chassis.

A host stack 115 executes on at least one CPU 104. A host stack may be described as software that includes programs, libraries, drivers, and an operating system that run on host processors (e.g., CPU 104) of a host computer 102. One or more programs 116 (e.g., host software, application programs, and/or other programs) and an operating system 118 reside in memory 106 during execution and execute on one or more CPUs 104.

The host computer 102 may comprise any suitable computing device, such as a mainframe, server, personal computer, workstation, laptop, handheld computer, telephony device, network appliance, virtualization device, storage controller, etc. Any suitable CPU 104 and operating system 118 may be used. The CPU 104 may have a cache but in alternative embodiments may the CPU 104 may lack a cache. Programs and data in memory 106 may be swapped among memory 106, storage 108 and a CPU 104 cache as part of memory management operations. One or more data structures 126 may reside in memory 106 and facilitate operation of the host computer 102.

Operating system 118 includes device drivers 120, such as one or more network drivers 122 and one or more storage drivers 124, which reside in memory 106 during execution. Each device driver 120 includes device specific commands to communicate with an associated device 110a . . . 110n and interfaces between the operating system 118, programs 116 and the associated device 110a . . . 110n. The devices 110a . . . 110n and device drivers 120 employ logic to process various functions including I/O functions.

Each device 110a . . . 110n includes various components implemented in the hardware of the device 110a . . . 110n. The network controller 110n of the illustrated embodiment is capable of transmitting and receiving data over an I/O fabric 114 which may comprise a Local Area Network (LAN), the Internet, a Wide Area Network (WAN), a Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc.

In the illustrated embodiment, each I/O device 110a . . . 110n includes an I/O adapter, which in certain embodiments, is a Host Bus Adapter (HBA). In the illustrated embodiment, an I/O adapter 142 includes a bus controller 144, an I/O controller 146, and lower protocol layers 148 of a protocol stack. The bus controller 144 enables the device 110a . . . 110n to communicate on a bus 112 which may comprise any suitable bus interface, such as any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002), published March 2002), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc or another type of peripheral bus.

The I/O controller 146 provides functions used to perform I/O functions. The lower protocol layers 148 provides functionality to send and receive information over a network, or directly to and from an I/O device such as a storage device, a display, a printer, a keyboard, mouse etc. In the illustrated embodiment, the lower protocol layers 148 and the I/O controller 146 of the network controller 110n send and receive network packets to and from remote devices or computer systems over an I/O fabric 114. In certain embodiments, the I/O controller 146 and the lower protocol layers 148 may implement the Ethernet protocol (IEEE std. 802.3, published Mar. 8, 2002) over unshielded twisted pair cable, TCP/IP (Transmission Control Protocol/Internet Protocol), Remote Direct Memory Access (RDMA), token ring protocol, Fibre Channel (IETF RFC 3643, published December 2003), Infiniband, or any other suitable networking protocol. Details on the TCP protocol are described in "Internet Engineering Task Force (IETF) Request for Comments (RFC) 793," published September 1981, details on the IP protocol are described in "Internet Engineering Task Force (IETF) Request for Comments (RFC) 791, published September 1981, and details on the RDMA protocol are described in the technology specification "Architectural Specifications for RDMA over TCP/IP" Version 1.0 (October 2003).

The network controller 110n may be integrated into the CPU chipset, which can include various controllers including a system controller, peripheral controller, memory controller, hub controller, I/O bus controller, etc. Alternatively, the network controller 110n may comprise separate integrated circuits disposed on an expansion board which is connected to the local bus 112 in an expansion slot. In yet another embodiment, the network controller 110n may be housed in separate chassis.

The devices 110a . . . 110n may include additional hardware logic to perform additional operations. For example, the I/O controller 146 of the device 110n of the illustrated embodiment may include upper protocol layers to send and receive network packets to and from remote devices over the I/O fabric 114. The lower protocol layers 148 of the device 110n can include a data link layer and a physical layer which includes hardware such as a data transceiver. Upper protocol layers may also be provided by the CPU 104 executing software maintained in the memory 106 or elsewhere.

Figure 2:
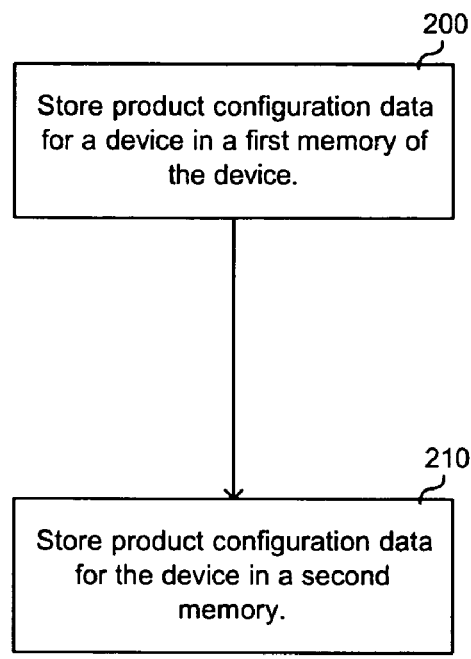
FIG. 2 illustrates an embodiment of operations to manage configuration data of components of a computer system.

FIG. 2 illustrates an example of operations which may be undertaken to facilitate device configuration and operation. In one operation, configuration data for a device may be stored (block 200) in a first memory of the device. For example, a configuration data structure 202n (FIG. 1) may be stored in a memory 204 of the network controller 110n.

The memory 204 may be a programmable, nonvolatile memory such as flash ROM or EEPROM, for example. It is appreciated that other types of memory may be used as well.

Figure 3:
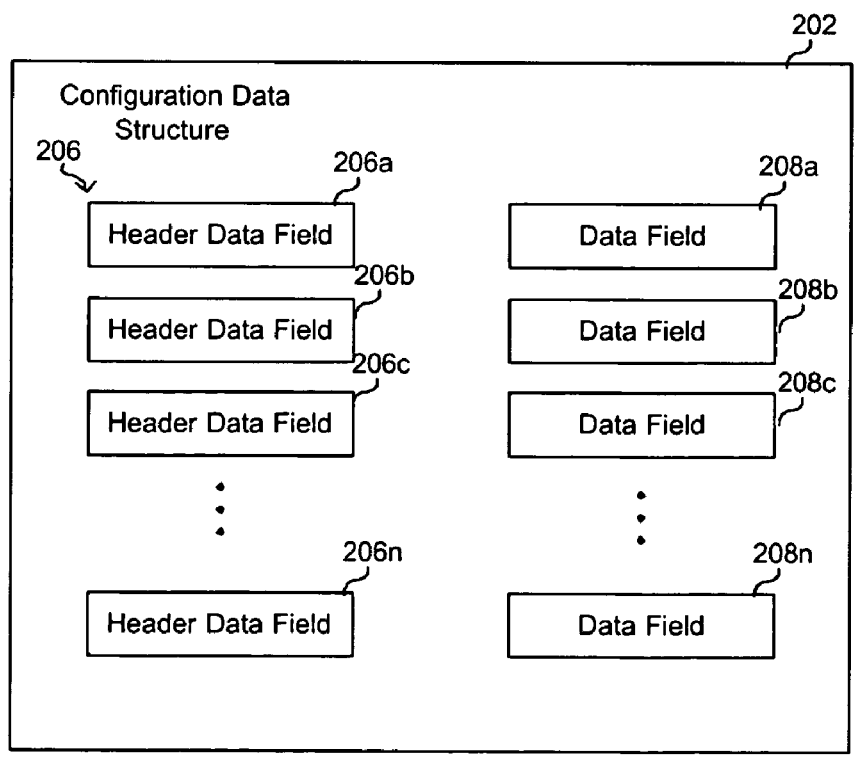
FIG. 3 illustrates a known example a configuration data structure.

FIG. 3 shows an example of a commonly used configuration data structure 202 which includes a configuration header 206 comprising a plurality of data fields 206a, 206b . . . 206n. In the illustrated embodiment, the configuration header 206 is a known PCI configuration header. It is appreciated that other types of headers may be utilized as well.

In this example, the fields 206a, 206b . . . 206n may be used to store data representing one or more of device identification, vendor identification, status, command, class code, base address registers, interrupt line, interrupt pin, medium access control (MAC) address, EEPROM version, firmware version, etc, depending upon the particular device and its application. This information may be stored, for example, by the device manufacturer prior to shipping the device for use. It is appreciated that the configuration data structure 202 may be stored by others including the consumer or user or operator, depending upon the particular application.

The configuration data structure 202 may be include additional data fields 208a, 208b . . . 208n. These fields may be used to store data such as update data. It is appreciated that fields 208a, 208b . . . 208n of the configuration data structure 202 may be written to during initialization as well as normal operation of the device 110a, 110b . . . 110n.

In a similar manner, the manufacturer of the storage controller 110a may store a configuration data structure 202a (FIG. 1) in a memory, such as a programmable, nonvolatile, memory, in the storage controller 110a, and the manufacturer of the device 110b may store a configuration data structure 202b in a memory of the device 110b. Similarly, the manufacturer of the storage 108 may store a configuration data structure 242 in a memory of the storage 108. The data stored in each configuration data structure 202a, 202b . . . 202n, 242 may vary, depending upon the particular application. It is appreciated that the user of the devices may store this configuration information also.

In another operation, configuration data for a particular device may be stored (block 210, FIG. 2) in a second memory. In the example of the network controller 110n, the second memory may be a nonvolatile memory 232 of the host computer 102. Thus, if the circuits of the network controller 110n are located on a portion of the motherboard of the host computer 102, for example, the circuits of the nonvolatile memory 232 may be conveniently located on a portion of the motherboard as well. Accordingly, a configuration data structure 234n may be stored in the memory 232 supported by a portion of the motherboard. As explained below, the configuration data structure 234n may be used as a backup to restore the configuration data structure 202n should data within the data structure 202n become corrupted or otherwise unavailable or unsuitable. The backup configuration data structure 234n may include some or all of the data of the configuration data structure 202n.

In the example of the storage controller 110a, the second memory may again be the nonvolatile memory 232 of the host computer 102. Thus, if the circuits of the storage controller 110a are supported by and interconnected by a portion of the motherboard of the host computer 102, for example, a backup configuration data structure 234a may be conveniently stored in the memory 232 to backup the configuration data structure 202a of the storage controller 110a.

In one embodiment, the memory 232 may be a nonvolatile memory which is relatively resistant to data corruption, such as a read-only memory (ROM), for example. Examples of ROM include programmable read-only memory (PROM), erasable programmable read-only memory (EPROM); EEPROM, Flash memory, etc. It is appreciated that the memory 232 may be other types of memory as well, depending upon the particular application.

In addition, the backup configuration data structures 234a, 234b, . . . 234n of the memory 232 may be physically maintained by a single integrated circuit chip. Alternatively, the backup configuration data structures 234a, 234b, . . . 234n of the memory 232 may be physically maintained by several integrated circuit chips disposed in one or more locations distributed about the motherboard or other locations.

In the example of the device 110b, a backup configuration data structure 234b may also be stored in the memory 232 to backup the configuration data structure 202b of the device 110b. In an alternative embodiment, a backup configuration data structure 250 may instead (or in addition thereto) be stored in an on-board memory which is carried by a separate support of the device 110b, to backup the configuration data structure 202a of the storage controller 110a. Thus, if the device 110b is a separate expansion card, for example, the on-board memory for the backup configuration data structure 250 may be disposed on and supported by the expansion card of the device 110b instead of a motherboard.

In the example of the storage device 108, a backup configuration data structure 252 may again be stored in an on-board memory to backup the configuration data structure 242 of the storage 108. Thus, if the storage 108 is a hard drive, for example, the memory storing the backup configuration data structure 252 may be carried on and supported by a circuit board of the hard drive chassis.

Again, in one embodiment, each memory containing a backup data structure 250, 252 may be a nonvolatile memory which is relatively resistant to data corruption, such as a write once, read-only memory (ROM), for example. It is appreciated that these memory devices may be other types of memory as well, depending upon the particular application. For example, the memory may be a programmable, read-only memory such as PROM, EPROM, EEPROM, flash memory, etc.

Figure 4:
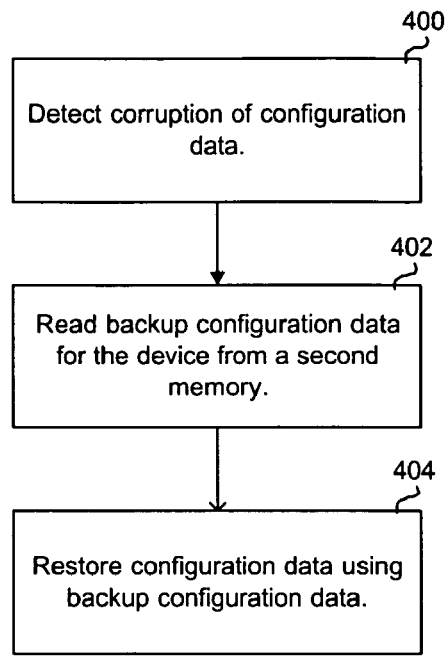
FIG. 4 illustrates another embodiment of operations to manage configuration data of components of a computer system.

FIG. 4 illustrates another example of operations which may be undertaken to facilitate device configuration and operation. In one operation, corruption of configuration data is detected (block 400). Corruption of data in a configuration data structure 202a, 202b, . . . 202n, 242 may occur due to a number of factors. For example, cosmic rays or mechanical shocks may corrupt data in a programmable, nonvolatile memory such as an EEPROM. Also, software errors may cause unintentional write operations to the EEPROM containing a configuration data structure, causing corruption of the configuration data. Other events may cause a configuration data structure to be erroneously changed, unavailable or otherwise corrupted.

Detection of corrupted configuration data may occur, for example, during initialization of the device associated with the corrupted configuration data. Thus, for example, the system processor 104 in reading data from a configuration data structure 202a, 202b . . . 202n, 242 may receive invalid data indicating corruption of the particular configuration data structure 202a, 202b . . . 202n, 242 from which it was read. There are a number of techniques which may be used to detect invalid data. For example, a checksum algorithm or a hash function such as the MD5 hash may be utilized. Also, a device 108, 110a, 110b . . . 110n may not initialize or operate as expected, also indicating a possible corruption of some or all of the associated configuration data structure 242, 202a, 202b . . . 202n.

In another operation, configuration data from a second memory may be read (block 402). Thus, for example, backup configuration data may be read from the backup configuration data structure 234n for the network controller 110n. This data read from the configuration data structure 234n may be used to restore (block 404) configuration data in the configuration data structure 202n, for example. In one example, the configuration data structure 202n may be restored to default values as set (block 210, FIG. 2) by the factory or other personnel.

Thus, data read from a backup configuration data structure 234a, 234b, . . . 234n, 250, 252 may be used to restore the associated configuration data structure 202a, 202b . . . 202n, 242 of the devices 110a, 110b . . . 110n, 108. It is appreciated that if the second memory such as the second memory 232 is a programmable memory, such as an EEPROM or hard drive storage memory, for example, the backup configuration data structures 234a, 234b, . . . 234n, 250, 252 may include updated data as well for purposes of restoring the associated configuration data structures 202a, 202b . . . 202n, 242.

The procedure used to restore the corrupted configuration data structure 202a, 202b . . . 202n, 242 may depend upon the particular memory type used to store the configuration data structure. Thus, for example, if the memory 204 used to store the configuration data structure 202n is an EEPROM, the system processor 104 can use a charge pump to raise the applied voltage to the EEPROM to a program level and write the backup data from the backup configuration data structure 234n to restore the configuration data of the structure 202n within the EEPROM 204.

Alternatively, a device such as the device 110b may have logic circuitry which upon being triggered, causes the on-board EEPROM storing the configuration data structure 202b to restore its configuration data to that of the backup configuration data structure 250 maintained by a second on-board memory such as a write once ROM, for example. Such a trigger may be provided by a user-actuatable switch on the particular device 110b or a control accessible by the system processor 104, for example. The process which provides access to the trigger may be widely published for use by users or consumers. Alternatively, in some applications the access process may be more restricted as a proprietary process to reduce inappropriate access.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA) such as a Field Programmable Gate Array (FPGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, flash memory, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the embodiments, and that the article of manufacture may comprise any suitable information bearing medium.

The described operations may be performed by circuitry, where "circuitry" refers to either hardware or software or a combination thereof. The circuitry for performing the operations of the described embodiments may comprise a hardware device, such as an integrated circuit chip, Programmable Gate Array, Application Specific Integrated Circuit, etc. The circuitry may also comprise a processor component, such as an integrated circuit, and code in a computer readable medium, such as memory, wherein the code is executed by the processor to perform the operations of the described embodiments.

The illustrated operations of FIGS. 2, 4 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

In the described embodiments, certain operations were described as being performed by the operating system 118, system processor 104, device driver 120, or the devices 108, 110a . . . 110. In alterative embodiments, operations described as performed by one of these may be performed by one or more of the operating system 118, system processor 104, device driver 120, or an device 108, 110a . . . 110n. For example, data read or data restoration operations described as being performed by the system processor or driver may be performed by the device itself.

In certain embodiments, a computer system includes a storage controller, such as a SCSI, Integrated Drive Electronics (IDE), Redundant Array of Independent Disk (RAID), etc., controller, that manages access to a nonvolatile storage device, such as a magnetic disk drive, tape media, optical disk, etc. In alternative embodiments, the system may not include a storage controller, such as certain hubs and switches.

In certain embodiments, a computer system may include a video controller to render information to display on a monitor coupled to the computer system including the device driver and network controller, such as a computer system comprising a desktop, workstation, server, mainframe, laptop, handheld computer, etc. Alternatively, a computing device may not include a video controller, such as a switch, router, etc.

Figure 5:
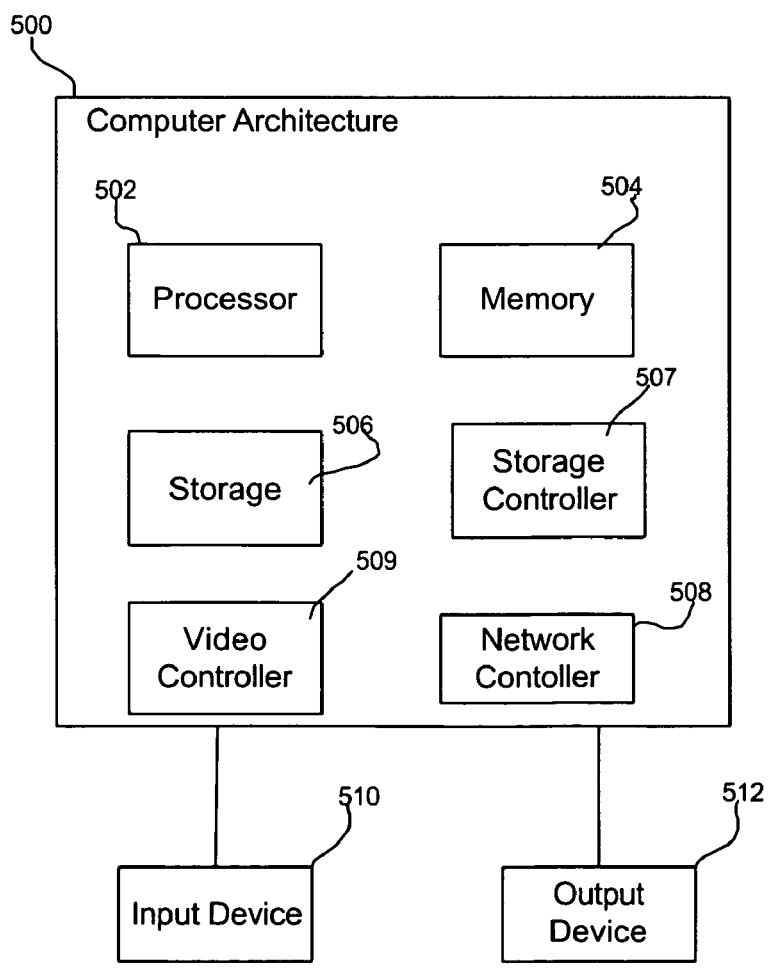
FIG. 5 illustrates an example of an architecture which may be used with described embodiments.

FIG. 5 illustrates one embodiment of a computer architecture 500 of a host computer. The architecture 500 may include a system processor 502 (e.g., a microprocessor), a memory 504 (e.g., a volatile memory device), storage 506 (e.g., a nonvolatile storage, such as magnetic disk drives, optical disk drives, a tape drive, etc.) and a storage controller 507. The storage 506 may comprise an internal storage device or an attached or network accessible storage. Programs in the storage 506 are loaded into the memory 504 and executed by the system processor 502 in a suitable manner. The architecture further includes a network controller 508 to enable communication with a network, such as an Ethernet, a Fibre Channel Arbitrated Loop, etc. Further, the architecture may, in certain embodiments, include a video controller 509 to render information on a display monitor, where the video controller 509 may be embodied on a video card or integrated on integrated circuit components mounted on the motherboard. As discussed, certain of the network devices may have multiple network cards or controllers. An input device 510 is used to provide user input to the system processor 502, and may include a keyboard, mouse, pen-stylus, microphone, touch sensitive display screen, or any other suitable activation or input mechanism. An output device 512 is capable of rendering information transmitted from the system processor 502, or other component, such as a display monitor, printer, storage, etc. The controller 507 may embodied on a network card, such as a PCI card, or some other I/O card, or on integrated circuit components mounted on the motherboard.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
reading device configuration data for a device from a first memory carried on said device wherein said device configuration data in said first memory is vital product data (VPD) which includes identification data identifying said device;
configuring said device using device configuration data read from said first memory of said device;
detecting corruption of device configuration data read from said first memory of said device;
reading backup device configuration data for said device from a second memory wherein said backup device configuration data in said second memory is vital product data (VPD) which includes identification data identifying said device; and
restoring device configuration data to said first memory using said backup device configuration data.

2. The method of claim 1 wherein wherein said second memory is carried on a motherboard of a system which includes said device; said method further comprising reading device configuration data for a plurality of devices from a first memory carried on each device wherein said device configuration data in each first memory is vital product data (VPD) which includes identification data identifying the associated device; configuring each device using device configuration data read from the associated first memory of each device; and storing said device configuration data read from said first memory of each device as backup device configuration data in said second memory.

3. The method of claim 1 wherein said vital product data in said first and second memories identifies at least one of serial number, model number, firmware release level, medium access control (MAC) address, of said device.

4. The method of claim 1 wherein said first memory is a programmable nonvolatile memory and said second memory is a nonvolatile memory.

5. The method of claim 1 further comprising:
storing said device configuration data in said first memory wherein said first memory is at least one of an electrically erasable programmable read-only memory (EEPROM) and a flash memory.

6. The method of claim 1 further comprising storing said backup device configuration data in said second memory wherein said second memory is a nonvolatile memory carried on said device.

7. The method of claim 1 wherein said second memory is carried on a motherboard of a system which includes said device; said method further comprising reading device configuration data for a plurality of devices from a first memory carried on each device; configuring each device using device configuration data read from the associated first memory of each device; and storing said device configuration data read from said first memory of each device as backup device configuration data in said second memory.

8. The method of claim 1 wherein said device is in a system which includes a system processor in addition to said device and wherein said restoring includes said system processor writing said backup device configuration data to said first memory.

9. The method of claim 1 wherein said restoring includes logic circuitry of said device writing said backup device configuration data to said first memory.

10. The method of claim 1 wherein said device configuration data is stored in a device configuration data structure having addresses in a bus configuration address space.

11. The method of claim 10 wherein said bus configuration space is a peripheral component interconnect (PCI) configuration address space and said device configuration data structure includes a PCI configuration header.

12. A device for use in a computer system, comprising:
a support;
a first memory carried by said support and containing device configuration data for said device wherein said device configuration data in said first memory is vital product data (VPD) which includes identification data identifying said device; and
a second memory carried by said support and containing backup device configuration data adapted to backup at least a portion of said device configuration data of said first memory wherein said backup device configuration data in said second memory is vital product data (VPD) which includes identification data identifying said device.

13. The device of claim 12 wherein said vital product data in said first and second memories identifies at least one of serial number, model number, firmware release level, medium access control (MAC) address, of said device.

14. The device of claim 12 wherein said first memory is a programmable nonvolatile memory and said second memory is a nonvolatile memory.

15. The device of claim 12 wherein said first memory is at least one of an electrically erasable programmable read-only memory (EEPROM) and a flash memory.

16. The device of claim 12 wherein said system has a motherboard having a connector and said device has a circuit board coupled to said motherboard connector and wherein said support includes a portion of said device circuit board and wherein said second memory is a nonvolatile memory carried by said device circuit board.

17. The device of claim 12 wherein said system includes a system processor and wherein said first memory is adapted to store said backup device configuration data written to said first memory by said system processor.

18. The device of claim 12 further comprising logic circuitry adapted to write said backup device configuration data to said first memory to restore at least a portion of said device configuration data in said first memory.

19. The device of claim 12 wherein said system has a bus configuration address space and wherein said first memory is adapted to maintain a device configuration data structure having addresses in said bus configuration address space and wherein said device configuration data is stored in said device configuration data structure.

20. The device of claim 19 wherein said bus configuration space is a peripheral component interconnect (PCI) configuration address space and said device configuration data structure includes a PCI configuration header.

21. A system, comprising:
a motherboard;
a system processor having a cache and carried by said motherboard;
a bus coupled to said system processor;
a device coupled to said bus and having a first memory containing device configuration data for said device wherein said device configuration data in said first memory is vital product data (VPD) which includes identification data identifying said device; and
a second memory containing backup device configuration data adapted to backup at least a portion of said device configuration data of said first memory wherein said backup device configuration data in said second memory is vital product data (VPD) which includes identification data identifying said device;
wherein said system processor is adapted to:
read device configuration data for said device from a first memory;
detect corruption of device configuration data;
initiate reading backup device configuration data for said device from said second memory; and
initiate restoring device configuration data to said first memory using said backup device configuration data.

22. The system of claim 21 wherein said system comprises a plurality of devices coupled to said bus, each device having a first memory containing device configuration data for the associated device wherein said device configuration data in each first memory is vital product data (VPD) which includes identification data identifying the associated device; and wherein said second memory contains backup device configuration data adapted to backup at least a portion of said device configuration data of said first memory of each of said devices wherein said backup device configuration data in said second memory is vital product data (VPD) which includes identification data identifying each of said devices coupled to said bus.

23. The system of claim 21 wherein said vital product data in said first and second memories identifies at least one of serial number, model number, firmware release level, medium access control (MAC) address, of said device.

24. The system of claim 21 wherein said first memory is a programmable nonvolatile memory and said second memory is a nonvolatile memory.

25. The system of claim 21 wherein said first memory is at least one of an electrically erasable programmable read-only memory (EEPROM) and a flash memory.

26. The system of claim 21 wherein said system motherboard has a connector and said device has a circuit board coupled to said motherboard connector and where said second memory is a nonvolatile memory carried by said device circuit board.

27. The system of claim 21 said second memory is carried by said motherboard.

28. The system of claim 21 wherein said system processor is adapted to write said backup device configuration data to said first memory to restore at least a portion of said device configuration data in said first memory.

29. The system of claim 21 wherein said device further comprises logic circuitry adapted to be responsive to said system processor initiation, to read said backup device configuration data from said second memory and to write said backup device configuration data to said first memory to restore at least a portion of said device configuration data in said first memory.

30. The system of claim 21 wherein said system has a bus configuration address space and wherein said first memory is adapted to maintain a device configuration data structure having addresses in said bus configuration address space and wherein said device configuration data is stored in said device configuration data structure.

31. The system of claim 30 wherein said bus configuration space is a peripheral component interconnect (PCI) configuration address space and said device configuration data structure includes a PCI configuration header.

32. An article for use with a system having at least one memory and a plurality of devices, each device having at least one memory containing device configuration data for the associated device wherein said device configuration data in said at least one memory is vital product data (VPD) which includes identification data identifying the associated device, said article comprising a hardware storage medium, the storage medium comprising machine readable instructions stored thereon to:
read device configuration data for a first device from a first memory of said first device;
detect corruption of said device configuration data of said first memory;
initiate reading backup device configuration data for said first device from a second memory wherein said backup device configuration data in said second memory is vital product data (VPD) which includes identification data identifying said first device; and
initiate restoring device configuration data to said first memory using said backup device configuration data.

33. The article of claim 32 wherein said second memory is carried on a motherboard of said system; said machine readable instructions including instructions to read device configuration data for a plurality of devices from a first memory carried on each device wherein said device configuration data in each first memory is vital product data (VPD) which includes identification data identifying the associated device, to configure each device using device configuration data read from the associated first memory of each device; and to store said device configuration data read from said first memory of each device as backup device configuration data in said second memory.

34. The article of claim 32 wherein said vital product data in said first and second memories identifies at least one of serial number, model number, firmware release level, medium access control (MAC) address, of said device.

35. The article of claim 32 wherein said first memory is a programmable nonvolatile memory and said second memory is a nonvolatile memory.

36. The article of claim 32 wherein said first memory is at least one of an electrically erasable programmable read-only memory (EEPROM) and a flash memory.

37. The article of claim 32 wherein said system has a motherboard which has a connector and said device has a circuit board coupled to said motherboard connector and where said second memory is a nonvolatile memory carried by said device circuit board.

38. The article of claim 32 wherein the storage medium further comprises machine readable instructions stored thereon to, upon said restoration initiation, write said backup device configuration data to said first memory to restore at least a portion of said device configuration data in said first memory.

39. The article of claim 32 wherein the storage medium further comprises machine readable instructions stored thereon to, upon said backup device configuration data reading initiation, to cause said device to read said backup device configuration data from said second memory and, upon said restoration initiation, to cause said device to write said backup device configuration data to said first memory to restore at least a portion of said device configuration data in said first memory.

40. The article of claim 32 wherein said system has a bus configuration address space and wherein said first memory is adapted to maintain a device configuration data structure having addresses in said bus configuration address space and wherein said device configuration data is stored in said device configuration data structure.

41. The article of claim 40 wherein said bus configuration space is a peripheral component interconnect (PCI) configuration address space and said device configuration data structure includes a PCI configuration header.

\* \* \* \* \*